United States Patent
Tahmassebpur et al.

(10) Patent No.: US 7,919,193 B1
(45) Date of Patent: Apr. 5, 2011

(54) SHIELDING, PARTICULATE REDUCING HIGH VACUUM COMPONENTS

(75) Inventors: Mohammed Tahmassebpur, San Ramon, CA (US); Salam Harb, Los Gatos, CA (US); Liqun Han, Pleasanton, CA (US); Marian Mankos, Palo Alto, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 409 days.

(21) Appl. No.: 11/877,713

(22) Filed: Oct. 24, 2007

Related U.S. Application Data

(60) Provisional application No. 60/970,332, filed on Sep. 6, 2007.

(51) Int. Cl.
*B32B 15/04* (2006.01)
*B32B 15/18* (2006.01)

(52) U.S. Cl. ........ 428/634; 428/678; 428/679; 428/680; 428/681

(58) Field of Classification Search ........................ None
See application file for complete search history.

(56) References Cited

U.S. PATENT DOCUMENTS

| | | | | |
|---|---|---|---|---|
| 5,874,178 A | * | 2/1999 | Takayasu | 428/681 |
| 6,860,948 B1 | * | 3/2005 | Pike, Jr. | 148/428 |

* cited by examiner

*Primary Examiner* — Aaron Austin
(74) *Attorney, Agent, or Firm* — Luedeka, Neely & Graham, P.C.

(57) ABSTRACT

A component for use in a high vacuum environment, the component including a core of non-magnetic Hastelloy with a cladding of nickel-iron covering the core at least in part. The component can be, for example, at least one of a gate valve for use in a high vacuum environment of an electron gun, a bearing, a slide way, a gate valve bearing, a rotary slide, a linear slide, an electron beam column, and electron beam chamber, and a vacuum chamber. In this manner, because the final mechanical tolerance is controlled by machining instead of part assembling, extremely high alignment accuracy is obtained. The final part provides field shielding as provided by the nickel alloy shell, low stray field provided by the non-magnetic Hastelloy, good vacuum performance, and tight mechanical tolerance control. Also, because Hastelloy has the advantage of a low oxidation rate in comparison to stainless steel and titanium, there is less contamination buildup due to conditions such as electron beam bombardment.

2 Claims, 2 Drawing Sheets

SHIELDING, PARTICULATE REDUCING HIGH VACUUM COMPONENTS

This application claims all priorities and other benefits of prior pending U.S. provisional application 60/970,332, filed 2007.09.06.

FIELD

This invention relates to the field of integrated circuit fabrication. More particularly, this invention relates to increasing the field shielding and reducing the particulates generated by high vacuum equipment components.

BACKGROUND

Modern integrated circuits are fabricated using a wide variety of processes, many of which are performed under high vacuum conditions. As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

Conventionally, high vacuum system components, such as electron beam columns and associated components, are fabricated from stainless steel, which has both relatively good mechanical performance and relatively good vacuum performance, and which is easy to machine. However, stainless steel has a relatively poor field shielding performance, and is prone to being magnetized. In order to resolve these relatively poor field shielding issues, two approaches are typically applied.

First, the component is made with iron and nickel-iron alloys. However, due to the high out gassing rate of such materials and the difficulty in making a knife-edge vacuum seal from such materials, achieving an ultra high vacuum level is very challenging if not impossible. Second, one or more Mu-metal sheet layers are used to provide field shielding for a stainless steel component. However, the resulting shielding efficiency is very limited because the sheet Mu-metal material cannot be made very thick. Also, mechanical vibration can be extremely destructive to such layered structures.

Titanium is often used to fabricate non-magnetic components that need to provide good field shielding, such as those that are disposed close to an electron beam path, and more especially for those parts immersed in the magnetic field. However, titanium is hard to machine and difficult to weld to other commonly used materials, like stainless steel and nickel-iron alloys. Thus, titanium parts are typically fabricated separately and then mechanically fastened into the high vacuum system, such as an electron beam column. This tends to create problems with proper alignment of the various components.

Another issue with the materials that are currently used in high vacuum systems is the amount of particulates that are generated by moving surfaces in non-magnetic but electrically conductive high vacuum applications. Moving components in such applications are typically highly polished and coated with low friction ceramics, such as titanium-nitride and hard chromium-diamond binary. In some applications, doped polytetrafluoroethylene is applied to sliding surfaces. Ceramic balls, such as silicon-carbide, silicon-nitride, sapphire, and aluminum-nitride have also been used.

Unfortunately, such materials tend to experience a relatively high rate of wear, and tend to shed a relatively large amount of particles into the high vacuum system. Such worn surfaces also cause relatively high levels of uncontrolled stiction, meaning that the desired smooth-sliding motion becomes susceptible to a "stick then slip" behavior that adversely affects the accuracy and precision of the sliding mechanisms. Further, the loose, non-conducting particles that are shed can become charged in certain applications, causing contamination and electrical problems.

What is needed, therefore, is a system that overcomes problems such as those described above, at least in part.

SUMMARY

The above and other needs are met by a component for use in a high vacuum environment, the component including a core of non-magnetic Hastelloy with a cladding of nickel-iron covering the core at least in part. In various embodiments, the component is at least one of a gate valve for use in a high vacuum environment of an electron gun, a bearing, a slide way, a gate valve bearing, a rotary slide, a linear slide, an electron beam column, and electron beam chamber, and a vacuum chamber.

In this manner, because the final mechanical tolerance is controlled by machining instead of part assembling, extremely high alignment accuracy is obtained. The final part provides field shielding as provided by the nickel alloy shell, low stray field provided by the non-magnetic Hastelloy, good vacuum performance, and tight mechanical tolerance control. Also, because Hastelloy has the advantage of a low oxidation rate in comparison to stainless steel and titanium, there is less contamination buildup due to conditions such as electron beam bombardment.

According to another embodiment of the invention there is described a method of forming a gate valve for use in a high vacuum environment of an electron gun. A core of non-magnetic Hastelloy is machined, as is a cladding of nickel-iron. The core is welded to the cladding to form the gate valve, and the gate valve is machined so as to remove any dimensional differences at the interface between the core and the cladding. In some embodiments there is an additional step of polishing the machined gate valve.

According to yet another aspect of the invention there is described a sliding component for use in a high vacuum environment, including a first structure having a base formed of non-magnetic Hastelloy C22HS. The base is coated with diamond-like-coating. A second structure is formed of an alumina-titanium-carbide composite, where the first structure and the second structure are formed so as to provide mating pieces of at least one of a linear slide and a rotary slide.

In various embodiments according to this aspect of the invention, the non-magnetic Hastelloy C22HS is mirror polished prior to coating with the diamond-like-coating. In some embodiments the first structure is mirror polished. In some embodiments the diamond-like-coating is doped to be electrically conductive. In some embodiments the first structure is a guideway and the second structure is a carriage slide.

BRIEF DESCRIPTION OF THE DRAWINGS

Further advantages of the invention are apparent by reference to the detailed description when considered in conjunction with the figures, which are not to scale so as to more

DETAILED DESCRIPTION

One embodiment of the present invention provides an innovative shielding technique, such as for an electron-beam column, that provides high shielding efficiency for magnetic direct current fields and electromagnetic interference (generally referred to as field shielding herein), low magnetic stray fields around the beam path, ultra low out-gassing for high vacuum performance, and tight mechanical alignment tolerances.

Various embodiments of the present invention use Hastelloy in combination with other materials (Hastelloy is a registered trademark of Haynes International, Inc.). Hastelloy has a non-magnetic behavior that is close to that of titanium, and much better than that of standard non-magnetic stainless steel. It is also easily welded with nickel alloys, has a relatively low out-gassing rate, a relatively high hardness for machining a knife-edge seal, and a relatively low porosity surface finish.

Figure 1:
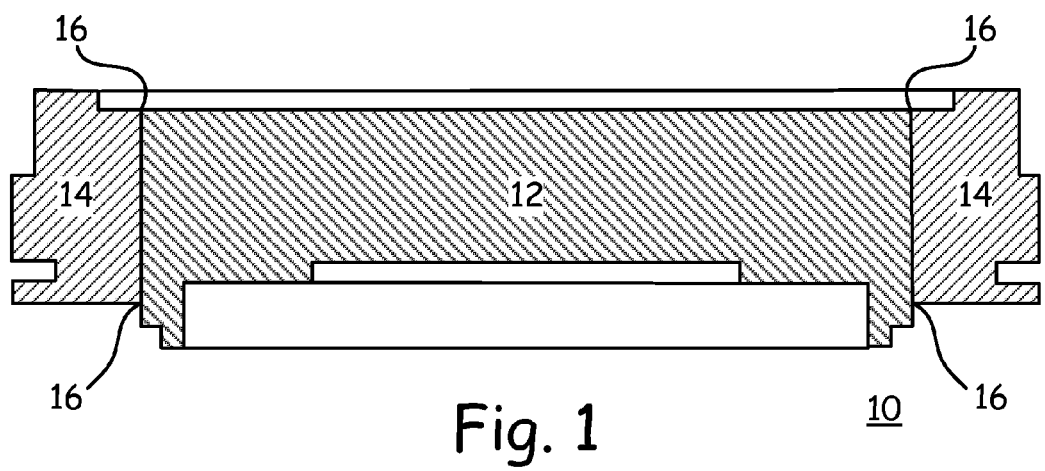
FIG. 1 is a cross sectional view of a gate valve according to an embodiment of the present invention.
Figure 2:
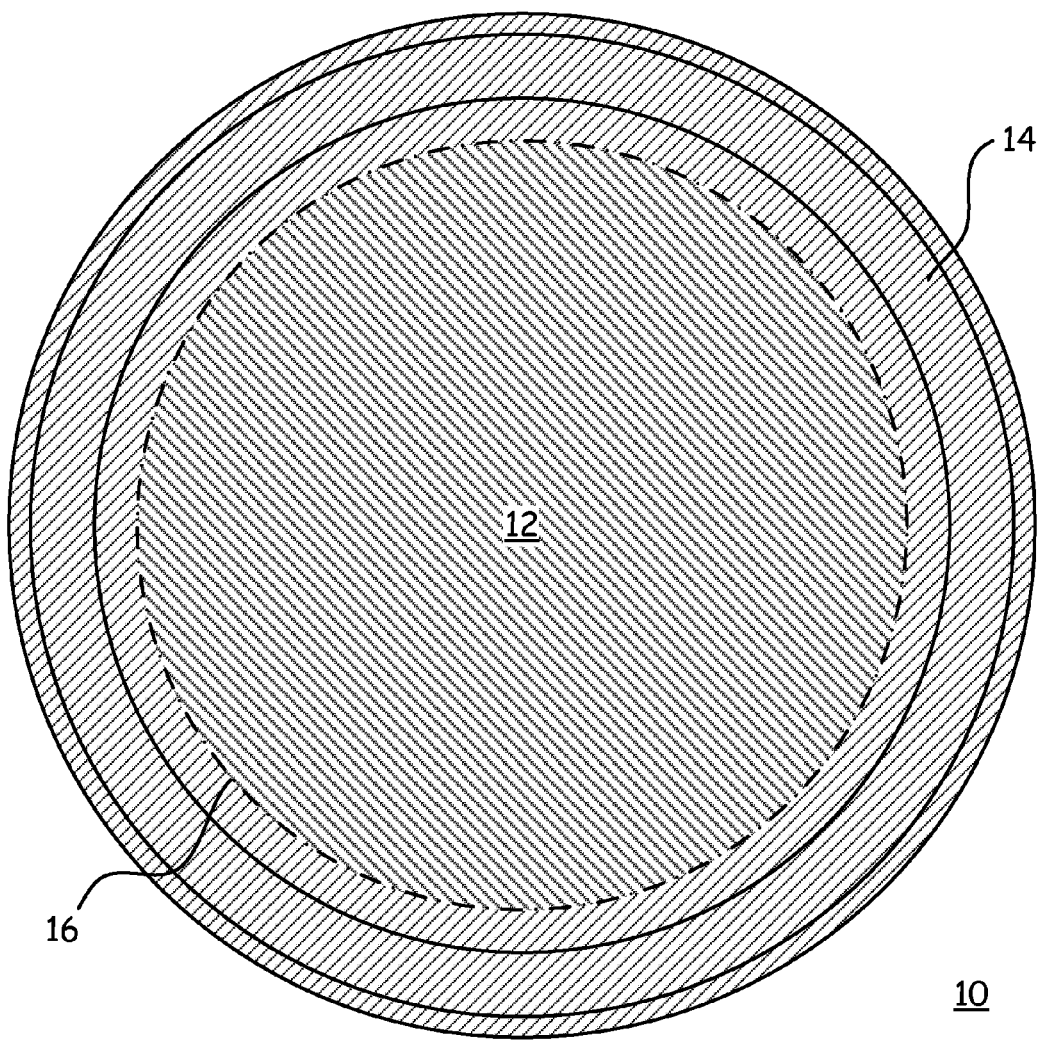
FIG. 2 is a top plan view of a gate valve according to an embodiment of the present invention.

In one embodiment as depicted in FIGS. 1 and 2, components such as a vacuum column, vacuum chamber, and associated parts are machined out of a non-magnetic Hastelloy 12, and then welded to an outer shell of nickel-iron alloy 14, which serves as the shielding layer. The welded assembly 10 is fine machined to the final mechanical tolerance. Because the final mechanical tolerance is controlled by the fine machining instead of part assembling, extremely high alignment accuracy is obtained. The final part provides field shielding as provided by the nickel alloy shell 14, low stray field provided by the non-magnetic Hastelloy core 12, good vacuum performance, and tight mechanical tolerance control. Also, because Hastelloy has the advantage of a low oxidation rate in comparison to stainless steel and titanium, there is less contamination buildup due to conditions such as electron beam bombardment.

One embodiment of the present invention is a gate valve 10 for an electron gun with a magnetic lens, as depicted in FIGS. 1 and 2. There are several properties that are desirable in such an application. Mechanical parts close to the electron beam path should be non-magnetic because of the extension of the magnetic field generated by the magnetic lens. The axis of the whole assembly should be mechanically well-aligned with the rest of the gun for the best optical performance. The vacuum housing should be made of a low out-gassing material to achieve the required high-vacuum (less than about one nanotorr). The whole assembly should be efficiently shielded to prevent electron beam jittering. The inner surface of the housing should be highly polished so as to provide for a good vacuum seal. Because the inner wall of the housing may suffer from electron beam bombardment during gun operation, a low oxidation rate is highly desirable. In some applications, low particulate generation during gate valve cycling is desirable. All the above requirements can be met by various embodiments of the present invention.

Embodiments of the present invention can be implemented into any sections of an electron-beam column, including the beam source, gate valve, column, and chamber, where the above tight requirements may apply. Embodiments can also be applied in any electron-beam related technology, including but not limited to electron beam inspection, review, CDSEM, and lithography, etc.

Figure 3:
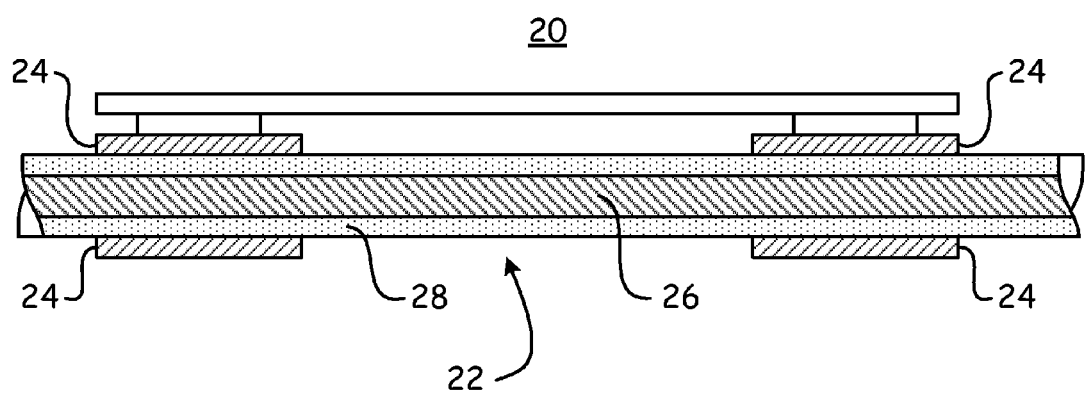
FIG. 3 is a cross sectional view of a slider according to an embodiment of the present invention.

In a sliding or bearing application, there are at least two parts that are in relative motion: stationary base-guideways and moving carriage-slides. Using the materials according to the various embodiments of the present invention for high vacuum sliding or bearing applications significantly reduces the amount of wear and particulation. In one embodiment as depicted in FIG. 3, one surface, such as a guideway 22, is formed of highly polished Hastelloy C22HS alloy 26 with diamond-like-coating 28, and the associated carriage slide 24 is formed of a highly polished alumina-titanium-carbide composite, forming a sliding component 20.

Hastelloy C22HS is composed of nickle-chromium-molybdenum-iron-tungster-silicon-carbon. This alloy is non-magnetic and electrically conductive. The alloy has a very high tensile strength of 750 megapascals. This alloy also maintains its hardness at higher temperatures. The inherent high strength (hardness) of this alloy, combined with its ability to hold a mirror-polish, reduces instances of cracking of a hard coating, such as diamond-like-coating, which might otherwise be caused by surface deformation from exerted frictional forces. Hastelloy C22HS also maintains its hardness at higher temperatures.

Diamond-like-coating has a hardness of about 2500 Vickers, which is very close to that of diamond crystals. In various embodiments, the diamond-like-coating is made thin enough to substantially follow the surface finish of the Hastelloy C22HS base-part. In some embodiments the diamond-like-coating is also doped so as to be electrically conductive. Alumina-titanium-carbide is a nanoceramic composite that is non-magnetic and electrically conductive. The composite is comprised of extremely small nanoparticles, of about one micron in size, and can be polished to a mirror finish. It is the anti-affinity of diamond-like-coating on Hastelloy C22HS with alumina-titanium-carbide that leads to such low particulation, low friction, sliding mechanisms.

High vacuum components—such as high precision bearings and slide ways, gate-valve bearings, electron-gun gate-valves, and rotary and linear slides—made according to the embodiments of the present invention exhibit low particulation, are non-magnetic, can tolerate a relatively high degree of thermal variation, and can be used where applied liquid or powder lubricants are not allowed, such as vacuum systems, spinning wafer-chucking mechanisms, medical and space applications, satellite mirrors and antennae, and other applications that require high levels of cleanliness.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A component for use in a high vacuum environment, the component comprising:
   a core of non-magnetic nickel-chromium-molybdenum-iron-tungsten-silicon-carbon alloy that is weldable with nickel alloys and has a tensile strength of about 750 megapascals, and
   a cladding of nickel-iron covering the core at least in part, and welded to the core, the cladding and the core forming an external surface of the component, where the external surface has been machined after welding to be aligned at the weld between the core and the cladding.

2. The component of claim 1, wherein the component comprises at least one of a gate valve for use in a high vacuum environment of an electron gun, a bearing, a slide way, a gate valve bearing, a rotary slide, a linear slide, an electron beam column, an electron beam chamber, and a vacuum chamber.

* * * * *